(12) United States Patent
Mishra

(10) Patent No.: US 11,363,084 B1
(45) Date of Patent: Jun. 14, 2022

(54) METHODS AND SYSTEMS FOR FACILITATING CONVERSION OF CONTENT IN PUBLIC CENTERS

(71) Applicant: Anilkumar Krishnakumar Mishra, Fremont, CA (US)

(72) Inventor: Anilkumar Krishnakumar Mishra, Fremont, CA (US)

( * ) Notice: Subject to any disclaimer, the term of this patent is extended or adjusted under 35 U.S.C. 154(b) by 533 days.

(21) Appl. No.: 16/129,574

(22) Filed: Sep. 12, 2018

Related U.S. Application Data

(63) Continuation-in-part of application No. 15/842,719, filed on Dec. 14, 2017, now Pat. No. 11,182,417.

(51) Int. Cl.
| | |
|---|---|
| *G06F 16/438* | (2019.01) |
| *H04L 65/612* | (2022.01) |
| *H04L 65/611* | (2022.01) |
| *H04N 21/2343* | (2011.01) |
| *G10L 15/26* | (2006.01) |
| *H04N 21/45* | (2011.01) |
| *G10L 13/08* | (2013.01) |
| *H04N 21/475* | (2011.01) |

(52) U.S. Cl.
CPC ........ *H04L 65/4084* (2013.01); *G06F 16/438* (2019.01); *G10L 13/086* (2013.01); *G10L 15/26* (2013.01); *H04L 65/4076* (2013.01); *H04N 21/2343* (2013.01); *H04N 21/4532* (2013.01); *H04N 21/4755* (2013.01)

(58) Field of Classification Search
CPC .. G06F 16/116; G06F 16/1794; G06F 16/258; G06F 16/84–88; G06F 16/9577; G06F 16/43; G06F 16/438
See application file for complete search history.

(56) References Cited

U.S. PATENT DOCUMENTS

| | | | |
|---|---|---|---|
| 5,845,283 A * | 12/1998 | Williams | ............... G06F 16/258 |
| 7,200,809 B1 * | 4/2007 | Paul | ................... H04L 67/2804 |
| | | | 715/205 |
| 8,019,773 B2 | 9/2011 | Kobayashi et al. | |
| 8,073,866 B2 | 12/2011 | Eagle et al. | |
| 8,806,326 B1 | 8/2014 | Lippinen | |
| 8,825,576 B2 | 9/2014 | Aravamudan et al. | |
| 9,569,541 B2 | 2/2017 | Andersen et al. | |
| 10,264,327 B2 * | 4/2019 | Scholes | ............ H04N 21/43637 |

(Continued)

*Primary Examiner* — Robert W Beausoliel, Jr.
*Assistant Examiner* — Nirav K Khakhar
(74) *Attorney, Agent, or Firm* — Kanika Radhakrishnan; Evergreen Valley Law Group

(57) ABSTRACT

A public center is disclosed. The public center includes at least one content source configured to provide a plurality of input contents and at least one content converter device for generating a plurality of output contents from the plurality of input contents based on user requests from a plurality of users. The content converter device includes an input module configured to receive a user request from a user of the plurality of users and an input content of the plurality of input contents based on the user request. The content converter device further includes a processing module configured to generate an output content from the input content based on input content characteristics. The public center includes a plurality of content access devices configured to provide the plurality of output contents received from the at least one content converter device to the plurality of users.

20 Claims, 7 Drawing Sheets

(56) References Cited

U.S. PATENT DOCUMENTS

| | | |
|---|---|---|
| 2003/0159145 A1 | 8/2003 | Kaltz |
| 2006/0123053 A1* | 6/2006 | Scannell ............. G06F 16/9577 |
| 2006/0206524 A1* | 9/2006 | MacLaurin ........... G06F 16/258 |
| 2012/0105719 A1* | 5/2012 | Fratti ................. H04N 21/8106 |
| | | 348/462 |
| 2015/0309768 A1 | 10/2015 | Van Der Heide |
| 2016/0036962 A1* | 2/2016 | Rand ....................... H04W 4/02 |
| | | 455/418 |
| 2016/0065637 A1* | 3/2016 | O'Malley ............... H04L 67/22 |
| | | 709/231 |

* cited by examiner ured to receive a user request from a user of the plurality of users and an input content of the plurality of input contents based on the user request. The user request includes one or more user preferences. The content converter device further includes a processing module configured to generate an output content from the input content based on input content characteristics. The input content characteristics are accessed from a plurality of content based library files for conversion of the input content into the output content. The public center includes a plurality of content access devices configured to
METHODS AND SYSTEMS FOR FACILITATING CONVERSION OF CONTENT IN PUBLIC CENTERS

TECHNICAL FIELD

Embodiments of the disclosure relate generally to content conversion and, more particularly to, methods and systems for facilitating content conversion in public centers, such as libraries and theaters.

BACKGROUND

Generally, multimedia data includes a combination of audio, video, and text (hereinafter collectively referred to as content). Content conversion of multimedia data provides new opportunities and benefits to many people. For example, using content conversion technology, a person visiting a library may be enabled to read or hear a book written in any other language than the one of his/her native language. As another example, a person may be enabled to watch and hear a leaning video in his own native language. Nowadays, few content conversion approaches are available that provide content conversion based on user preferences.

Converting content based on user preferences using content conversion approaches facilitate many opportunities for social interactions and learning. For example, a group of students from a diverse culture can gain the same knowledge from a teacher irrespective of the language they know or use using content conversion facilities. But there is no single place available where people from different background and culture can go and share their thoughts and learning with different peoples using their own native language or their own way of communication and can gain knowledge from others in the same way.

In view of the above, there is a need of a center or a place which will employ content conversion tools to facilitate people from diverse culture to come and share their life leanings with others using their own way of communication. The people can also read books and articles or can watch videos in their own native language irrespective of the original language used in the books, articles, and videos using content conversion tools provided at the center.

SUMMARY

Various embodiments of the present disclosure provide a method and a system for facilitating content conversion in public centers.

An embodiment provides a public center. The public center includes a content source configured to provide a plurality of input contents. The public center includes at least one content converter device for generating a plurality of output contents from the plurality of input contents based on user requests from a plurality of users. A content converter device includes an input module configured to receive a user request from a user of the plurality of users and an input content of the plurality of input contents based on the user request. The user request includes one or more user preferences. The content converter device further includes a processing module configured to generate an output content from the input content based on input content characteristics. The input content characteristics are accessed from a plurality of content based library files for conversion of the input content into the output content. The public center includes a plurality of content access devices configured to provide the plurality of output contents received from the at least one content converter device to the plurality of users.

Another embodiment provides a public center. The public center includes a plurality of content sources, where each content source is configured to provide a plurality of input contents. The public center includes a plurality of content converter devices for generating a plurality of output contents from the plurality of input contents based on receipt of user requests from a plurality of users. Each content converter device of the plurality of content converter devices includes an input module configured to receive a user request from a user of the plurality of users and an input content of the plurality of input contents based on the user request. The user request includes one or more user preferences. The public center further includes a processing module configured to generate an output content from the input content based on input content characteristics and the one or more user preferences. The input content characteristics are accessed from a plurality of content based library files for conversion of the input content into the output content. The public center further includes a content access device configured to provide the output content to the user.

In another embodiment, a computer-implemented method includes receiving, by a processor, a plurality of user requests generated from a plurality of user devices associated with the plurality of users, wherein the plurality of user requests comprises a plurality of user preferences to facilitate a plurality of output content. The method includes receiving, by the processor, a plurality of input contents from a plurality of content sources based on the plurality of user preferences. The method further includes generating, by the processor, the plurality of output contents from the plurality of input contents based on input contents characteristics. The method further includes transmitting, by the processor, the plurality of output contents to a plurality of content access devices. The method includes facilitating, by the processor, playback of the plurality of output contents on the plurality of content access devices associated with the plurality of users, where each user of the plurality of users receives an output content from the plurality of output contents based on the user's preferences.

BRIEF DESCRIPTION OF THE FIGURES

For a more complete understanding of example embodiments of the present technology, reference is now made to the following descriptions taken in connection with the accompanying drawings in which.

Figure 1:
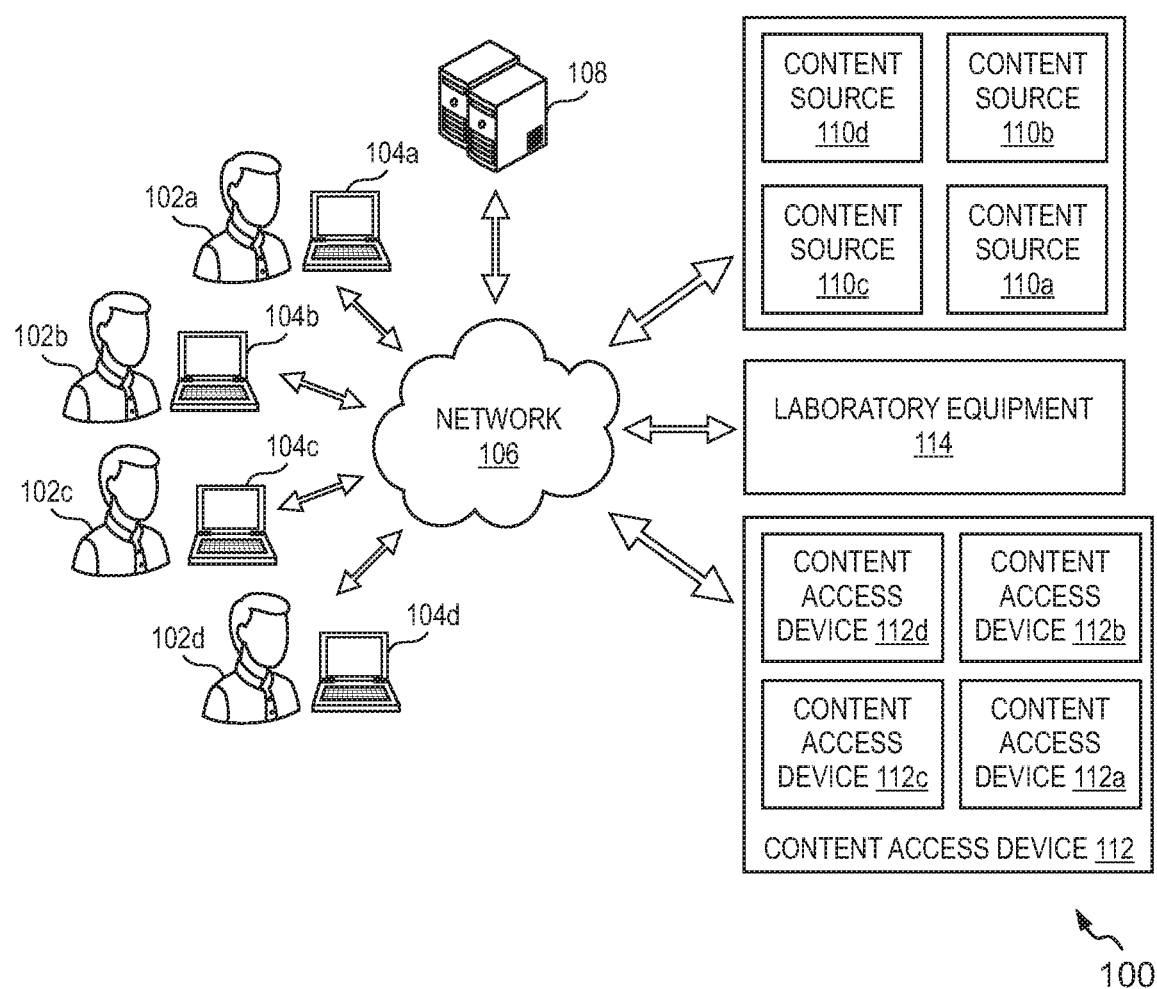
FIG. 1 illustrates an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments disclosed herein provide computer implemented methods, systems and devices for facilitating content conversion in a public center are disclosed. The public center is a concept of a place where people of all ages can meet together to exchange knowledge, communicate, learn & share joy, irrespective of language they understand and use. The public center may be an example of public libraries, movie theatres, live performance auditoriums, lecture halls, schools to learn knowledge and the like. The public center will be equipped with at least one content converter device and any other additional equipment and infrastructure needed for facilitating conversation and leaning between peoples from different background and culture. The public center will have its own rules and regulations and the users first have to enroll themselves to enjoy the services provided by the public center. The public center may also have their own R&D, production, operations and maintenance staff for managing the public center and may also provide lodging and boarding facilities to users who want to perform/participate in activities occurring within the public center.

The content converter device used in the public center will be configured to receive plurality of input contents from at least one content source available in the public center. For example, the input content includes audio input, text input, video input and a combination thereof (i.e., multimedia input). The users while enrolling may provide their preferences to a system installed at the public center incorporating the content converter device. User preferences may be provided through respective user devices. The system is configured to convert the plurality of input contents to the plurality of output contents as per user preferences. To achieve this, the system is configured to include a plurality of content based library files such as audio library files, video library files, text library files, language conversion library files and the like. The library files are generated using a laboratory equipment (e.g., an artificial intelligent device). Each library file further includes one or more respective content characteristics. For example, the audio library files include one or more audio characteristics and so on. The content characteristics of the plurality of input contents are utilized by the system to convert the plurality of input content to the plurality of output content. The plurality of output contents includes audio outputs, text outputs, video outputs and combination thereof (i.e., multimedia outputs). Further, the system is configured to transmit the plurality of output contents to a plurality of content access devices including the user devices provided at the public center. Each content access device of the plurality of content access devices includes a receiver that enables reception of desired output content by allowing user to tune into a particular radio frequency at which the desired output content is transmitted and an output interface to output the received output content. The content can also be sent as a stream over wired or wireless internet/intranet, described later. Various embodiments of the disclosure for facilitating content conversion in the public center are explained in detail herein with reference to FIGS. 1 to 6.

FIG. 1 illustrates an example environment 100 related to at least some embodiments of the present invention. It should be understood that the environment 100, illustrated and hereinafter described, is merely illustrative of an arrangement for describing some example embodiments, and therefore, should not be taken to limit the scope of the embodiments. As such, it should be noted that at least some of the components described below in connection with the environment 100 may be optional and thus in some example embodiments may include more, less or different components than those described in connection with the example embodiment of FIG. 1 or with subsequent FIGS. 2 to 6.

The environment 100 depicts a plurality of users 102a, 102b, 102c and 102d, a plurality of user devices 104a, 104b, 104c and 104d, a system such as a server 108, a plurality of content sources 110a, 110b, 110c and 110d, and a plurality of content access devices 112a, 112b, 112c and 112d (commonly represented as content access device 112) connected by a communication network such as a network 106. The users 102a, 102b, 102c and 102d operate the user devices 104a, 104b, 104c and 104d respectively. The users 102a, 102b, 102c and 102d can be of any age, and some of the users 102a, 102b, 102c and 102d may also include automated means including robots or similar artificial intelligence based devices. It shall be noted that four users 102a, 102b, 102c and 102d are shown for exemplary purpose only and there can be more or less number of users.

The user devices 104a, 104b, 104c and 104d may be any communication device having hardware components for enabling a platform to be presented at the user devices 104a, 104b, 104c and 104d. The user devices 104a, 104b, 104c and 104d may be capable of being connected to a wireless communication network (such as the network 106).

Examples of the user devices 104a, 104b, 104c and 104d include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like.

The content sources 110a, 110b, 110c and 110d are example of electronic devices capable of providing a plurality of input contents. Examples of input contents include audio inputs, text inputs, video inputs and/or multimedia inputs. Some non-exhaustive examples of the content sources 110a, 110b, 110c and 110d include a microphone, a Musical Instrument Digital Interface (MIDI), a media player, a digital camera, a camcorder, an image scanner, a character scanner, a mobile phone, a webcam, a fingerprint scanner, a mechanical or touch keyboard, a touch screen, a digital pen, a stylus and the like. The content access devices 112a, 112b, 112c and 112d are examples of electronic devices capable of providing a plurality of output contents to the plurality of users. Examples of output contents include audio outputs, text outputs, video outputs and/or multimedia outputs. Some non-exhaustive examples of the content access devices 112a, 112b, 112c and 112d include a printer, headphones, a speaker, a monitor, a mobile phone, a playback device, a projector, a tablet computer, a laptop, a mobile computer, a personal digital assistant (PDA), a mobile television, and the like. In some scenarios, the content converter device may include the content access devices such as the content access devices 112a, 112b, 112c or 112d.

In an example embodiment, the system 108 may be remotely located (e.g., in a cloud platform or otherwise) and capable of being accessed over the network 106. The system 108 may be a single composite server, or it may have multiple sub-systems. In some embodiments, the system 108 may be a physical computer or one or more cluster of computers. In other embodiments, it may be a virtualized server running on one or more physical computers under the control of a virtual machine provider. In another embodiment, the system 108 may be allocated according to processor cycles and storage requirements rather than according to the number of computers.

The network 106 may be a centralized network or may include a plurality of sub-networks that may offer a direct or indirect communication between the user devices 104a, 104b, 104c and 104d, the system 108, the content sources 110a, 110b, 110c and 110d and the content access devices 112a, 112b, 112c and 112d. For example, the network 106 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or ZigBee networks, and the like. An example of the combination of wired and wireless networks may include the Internet.

In an embodiment, the users 102a, 102b, 102c and 102d may be presented with one or more UIs (not shown) displayed on display screens of the user devices 104a, 104b, 104c and 104d to send a plurality of user requests to the system 108 for facilitating a plurality of output contents. Each user of the plurality of users 102a, 102b, 102c and 102d may also be used to provide one or more user preferences according to which the output content is desired to be received from the system 108. The user preferences and the request for the output content are received by the system 108 over the network 106.

For example, the users 102a, 102b, 102c and 102d may wish to watch an educational video in each of their native languages, while the educational video being recorded is in a language other than any of the native languages. As another example, the user 102a being a blind may want to read a book written in English language, the user 102b may want to see an educational movie in a German language while the movie is recorded in a French language, the user 102c being deaf wants to know about life experiences of the user 102d while the user 102d doesn't know how to communicate in sign language. So, the users 102a, 102b, 102c and 102d will send their preferences for receiving the output contents of their own wish.

In at least one example embodiment, upon receiving the plurality of user preferences and the plurality of user requests to receive the plurality of output contents, the system 108 is configured to utilize relevant input content characteristics from a plurality of content based library files stored therein to facilitate the conversion of the plurality of input contents to the plurality of output contents. In an embodiment, the system 108 may communicate with/include a laboratory equipment 114 that produces the content based library files. In another embodiment, the content based library files may be built-in devices obtained from the system 108, or can be obtained from the server for the content conversion. It should be noted that system 108 can facilitate the conversion of the plurality of input contents to the plurality of output contents in real time as well as offline. For example, as per request of a user such as the user 102a, a show recorded in English language can be converted into French language and provided to the user for download. The user can download the show and watch it later on a user device, such as the user device 104a.

In an embodiment, the users 102a, 102b, 102c and 102d will receive the desired output contents on the content access devices 112a, 112b, 112c and 112d respectively. In another embodiment, the users 102a, 102b, 102c and 102d will receive the desired output contents on the user devices 104a, 104b, 104c and 104d respectively. In some embodiments, the user devices 104a, 104b, 104c and 104d and the content access devices 112a, 112b, 112c and 112d may be the same. The various embodiments of the present disclosure, capable of facilitating content conversion in public centers, are explained hereinafter with reference to FIGS. 2 to 6

Figure 2:
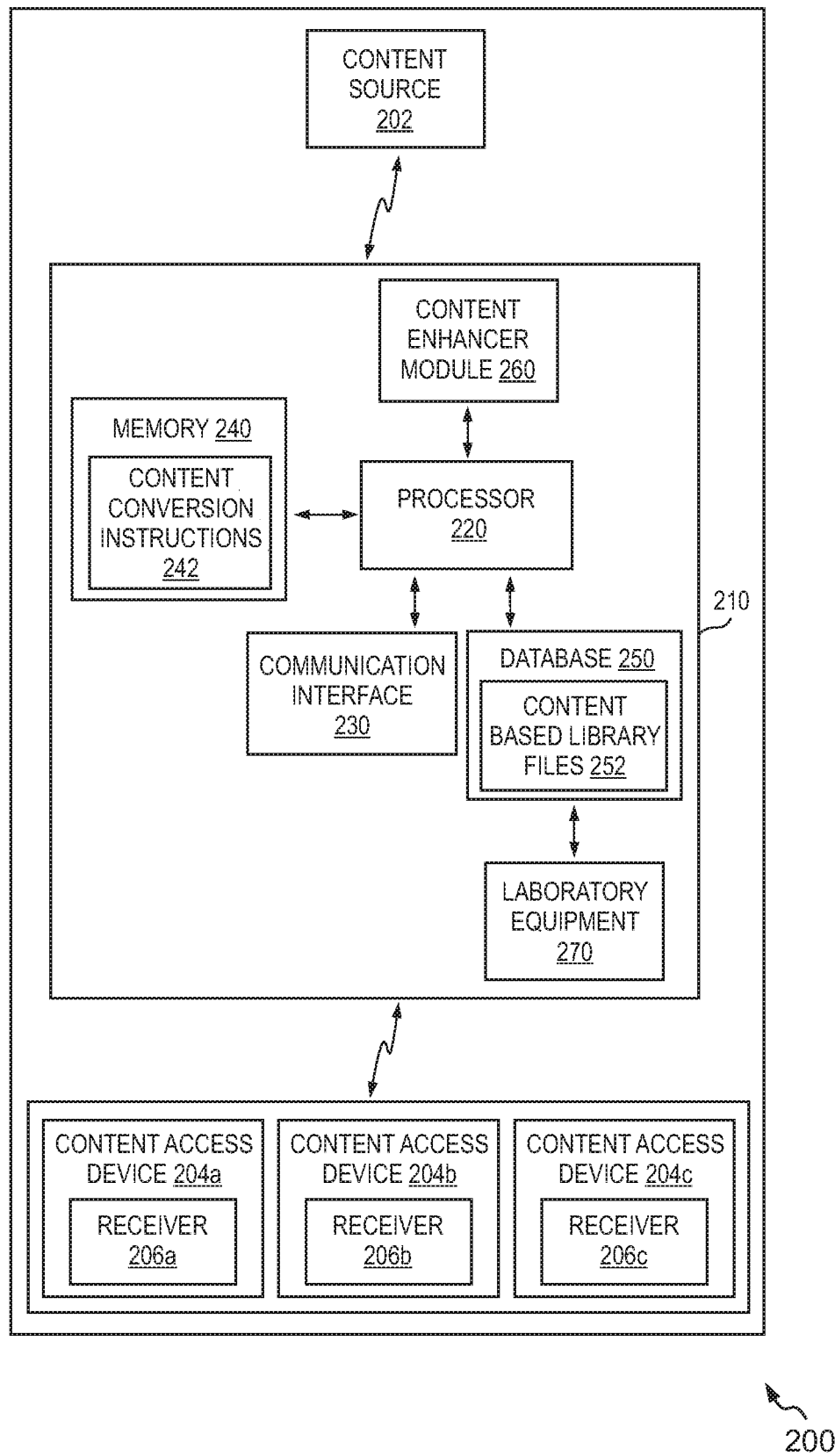
FIG. 2 illustrates a block diagram representation of a system for facilitating content conversion in a public center, in accordance with an example embodiment.

FIG. 2 illustrates a block diagram representation of a public center 200 illustrating a content converter device 210 for facilitating content conversion, in accordance with an example embodiment of the present disclosure. The content conversion device 210 can be embodied in the system 108 as shown in FIG. 1, and is in communication with at least one content source 202 and a plurality of content access devices 204a, 204b and 204c over a communication network (e.g., the network 106 shown in FIG. 1). In some scenarios, one or more of the content access devices 204a, 204b and 204c can be part of the content converter device 210. The system 108 may include at least one content converter device (explained in detail with reference to FIGS. 2 and 3) for facilitating content conversion in the public center 200. In one embodiment, the content source 202 and the content access devices 204a, 204b and 204c may correspond to electronic devices corresponding to end-users willing to receive output contents for entertainment, social interactions or learning purposes. The public center 200 may have their own set of rules and regulations, and the end-users willing to use the public center 200 must have to enroll themselves with the public center 200.

In an example embodiment, the content converter device 210 (an example of the system 108) includes at least one processor 220, a memory 240, a database 250, a communication interface 230 and a content enhancer module 260 for facilitating content conversion in the public center 200. The processor 220 is operatively coupled with the memory 240, the database 250, the communication interface 230 and the content enhancer module 260. The system 108 may operate on a single server or may be distributed across multiple servers that may be in the same location or different locations.

The database 250 is any computer-operated hardware suitable for storing and/or retrieving data, such as, but not limited to, a plurality of content based library files 252 (hereinafter referred to as content based library files 252), a plurality of user preferences, a plurality of content characteristics, a plurality of input contents, a plurality of output contents and the like. The database 250 may include multiple storage units such as hard disks and/or solid-state disks in a redundant array of inexpensive disks (RAID) configuration. The database 250 may include a storage area network (SAN) and/or a network attached storage (NAS) system. In some alternate embodiments, the database 250 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc. The system 108 includes one or more storage interfaces for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 220 with access to the database 250.

The processor 220 is capable of executing the stored machine executable instructions, hereinafter referred to as content conversion instructions 242 stored in the memory 240 of the system 108. The content conversion instructions 242 includes instructions for the functioning of the content converter device 202. The content conversion instructions 242 may include instruction to start and stop conversion of content (audio, video, text or any other multimedia content) based on delimiters between the units of content. The processor 220 is configured to perform the various operations. For example, the processor 220 may be configured to facilitate a plurality of output contents on the content access devices 204a, 204b and 204c based on receiving user preferences from the user devices (e.g., the user devices 104a, 104b, 104c and 104d shown in FIG. 1) and input content from the content source 202 via the communication interface 230. The processor 220 is further configured to utilize the content based library files 252 stored in the database 250 of the system 108 for facilitating the conversion of the input content into the output contents. The processor 220 may include one or more algorithms such as, but not limited to, speech to text algorithm, text to speech algorithm, speech recognition algorithm, face recognition algorithm, natural language processing algorithms and the like to facilitate content conversion. The processor 220, in conjunction with the content enhancer module 260, is configured to facilitate signal conditioning and quality enhancement of the input content received from the content source 202 using the content based library files 252. In an embodiment, the content enhancer module 260 is a part of the processor 220.

In an embodiment, the processor 220 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The system 108 further includes a laboratory equipment 270 (hereinafter referred to as a lab 270) to generate the library files 252. The lab 270 is user configurable for producing the library files 252 with various degree of precision and accuracy. In one embodiment, the lab 270 is an artificial intelligent device supported by human intelligence through manual editing mode and is made up of digital and analog hardware. The lab 270 can be interfaced/connected with all input-output devices (e.g., the content source 202 and the content access devices 204a, 204b and 204c) over wired or wireless network such as the network 106 of FIG. 1. Further the lab 270, can exist remotely outside the system 108 as per the need and depending upon cost, precision, accuracy desired, and any other human deciding factors.

The memory 240 may be configured to store the content conversion instructions 242 for the processor 220 to execute for facilitating content conversion in the public center 200. The memory 240 is a storage device embodied as one or more volatile memory devices, one or more non-volatile memory devices, and/or a combination of one or more volatile memory devices and non-volatile memory devices, for storing micro-contents information and instructions. The memory 240 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

The communication interface 230 is configured to facilitate communication between the system 108, the content source 202, the content access devices 204a, 204b and 204c, and the user devices associated with the users. In one embodiment, the communication interface 230 is configured to cause display of UIs on the content access devices 204a, 204b and 204c, thereby enabling the user to send the user preferences and to receive the output contents. In one embodiment, the communication interface 230 includes a receiver (not shown) for wirelessly receiving information from the content source 202 and the user devices, and a transmitter (not shown) for wirelessly communicating information to the content access devices 204a, 204b and 204c or other suitable display devices. The transmitter generally transmits or broadcasts the information over legally allowed radio frequencies. The transmitter can also transmit the information as a stream over wired or wireless internet/intranet. In another embodiment, the communication interface 230 is capable of facilitating operative communication with the remote devices and a cloud server using API (Application Program Interface) calls. The communication may be achieved over a communication network (such as the network 106 of FIG. 1).

The content access devices 204*a*, 204*b* and 204*c* include receivers (see, 206*a*, 206*b*, 206*c* for receiving the information transmitted by a transmitter (e.g., the transmitter 330 shown in FIG. 3) and at least one output interface (not shown) to output the received information. In an embodiment, the receivers 206*a*, 206*b*, 206*c* of the content access devices 204*a*, 204*b* and 204*c* may enable tuning to different frequencies of their desired channels over which desired contents are transmitted. The receivers may also demodulate the contents, modulated over radio frequencies, to reproduce the original contents after signal conditioning. In another embodiment, the receivers 206*a*, 206*b*, 206*c* of the content access devices 204*a*, 204*b* and 204*c* may receive the streams of content selectively by connecting to internet/intranet. The receivers 206*a*, 206*b*, 206*c* may also have capability to decompress content, if the content is transmitted and received in compressed format. Examples of the output interface may include, but are not limited to, a User Interface (UI) such as a UI display (such as a light emitting diode display, a thin-film transistor (TFT) display, a liquid crystal display, an active-matrix organic light-emitting diode (AMOLED) display, etc.), a speaker, a ringer, a vibrator, and the like. In some embodiments, the content access device, such as the content access devices 204*a*, 204*b* and 204*c* may be an augmented reality or heads-up display where projected image or graphic is superimposed over real-world view as perceived by the user through the output interface. In other embodiments, the content access devices 204*a*, 204*b* and 204*c* may also include an output screen which may raise characters of a document from the screen for touch and feel of the characters for visually impaired people.

In at least some example embodiment, the system 108 may include an Input/Output interface (I/O interface) (not shown in FIG. 2) configured to receive inputs from and provide outputs to the user of the system 108. To that effect, the I/O interface may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

Without loss of generality, an example of the public center 200 can be a content theme park such as Disneyland®, Universal Studio®, etc. The public center 200 can also be made part of existing theme parks. In such content theme parks, content converter devices can be deployed at various locations/sites to teach content conversion to visitors, to demonstrate the content conversion, and/or to perform content conversion with respect to various activities such as briefing the visitors about rules and regulations, allowing visitors to watch or listen to the shows in desired languages, read signs/routers/symbols in desired languages, etc. For instance, in one specific example, a content theme park can have a site deployed with the content converter devices where a visiting person can see him speaking in different unknown languages in his/her own voice or some other person's voice or computer generated voice. In another example, the content theme park can have a site where a visiting person can see him acting in movie that he writes on the spot when he goes to that site. It should also be noted that the content converter devices will be equipped to handle content conversion for contents that keep changing on a daily or weekly basis. For instance, in a given auditorium in a content theme park, if the language of content keeps changing, the content converter devices deployed therein will also accordingly take the changed content as input and provide the output content in many desired languages to different users.

Figure 3:
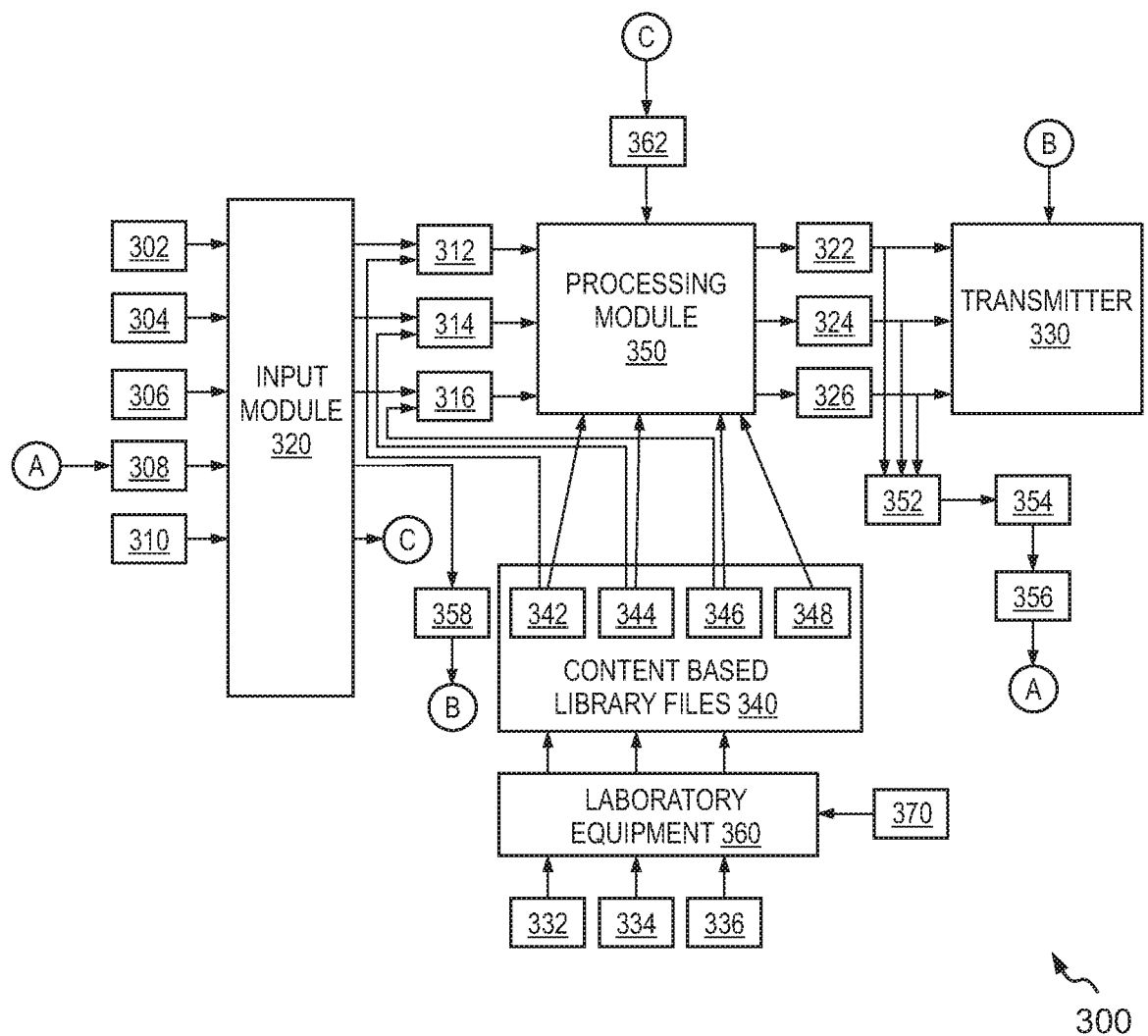
FIG. 3 illustrates a block diagram of a content converter device for facilitating content conversion in the public center, in accordance with an example embodiment.

FIG. 3 shows a block diagram of a content converter device 300 (hereinafter referred to as device 300) of FIG. 2 for facilitating content conversion in the public center 200, in accordance with an example embodiment of the present disclosure. In at least one embodiment, the device 300 includes an input module 320, a processing module 350, a plurality of content based library files 340 (hereinafter alternatively referred to as library files 340) and a transmitter 330.

The input module 320 is configured to receive a user request (see, box 310) to facilitate output content based on one or more user preferences provided by a user. The input module 320 is also configured to receive input content from at least one content source (see, boxes 302, 304, 306 and 308) based on the user request. For example, an audio source 302 is configured to provide an audio input. A text source 304 is configured to provide a text input. A video source 306 is configured to provide a video input. A multimedia source 308 is configured to provide a multimedia input to the device 300. The input content can be a stored input content, a content that is captured in real time, or the content accessed or streamed from other locations. For example, a stored text input file (e.g., received from the text source 304) may be in a soft copy on a Computer Disc (CD), a Universal Serial Bus (USB) drive, or any other storage devices, or may be downloaded from the Internet and the like or a hard copy printed on a paper drawn/written by human being or machines, in any language. The input module 320 may include at least one input device. Examples of the input device may include, but are not limited to, a keyboard, a mouse, a joystick, a keypad, a touch screen, soft keys, a microphone, a camera, a scanner and the like.

In one embodiment, the library files 340 may correspond to content based library files 252 stored in the database 250 of the system 108 of FIG. 2. The library files 340 further include audio library files 342, text library files 344, video library files 346, and language conversion library files 348 stored in the device 300 for use by the processing module 350. In one embodiment, the audio library files 342 include one or more audio characteristics, text library files 344 include one or more text characteristics, video library files 346 include one or more video characteristics and the language conversion library files 348 include one or more language characteristics. The library files 340 are generated using a laboratory equipment 360 (hereinafter referred to as a lab 360). The lab 360 may correspond to lab 270 of FIG. 2. In one embodiment, the lab 360 receives audio input in any format from an audio source 332 for defining the audio characteristics as per the user preferences to generate the audio library files 342. Similarly, the lab 360 receives text input in any format from a text source 334 for defining the text characteristics as per the user preferences to generate the text library files 344. Further, the lab 360 receives video input in any format from a video source 336 for defining the video characteristics as per the user preferences to generate the video library files 346. In one embodiment, the lab 360 may also include necessary files/sources for defining language conversion characteristics to generate the language conversion library files 348. In some embodiments, the input content received from the content sources 302, 304 and 306 may be the input content received from the content sources 332, 334 and 336, respectively, by the lab 360 for generating the audio library files 342, the text library files 344 and the video library files 346.

In one embodiment, the lab 360 is configured to receive inputs from a manual editor 370. More specifically, the lab 360 is user configurable for producing library files 340 of various degree of precision and accuracy using the manual editor 370. In one embodiment, the lab 360 and the manual editor 370 can be remotely located in the server system (such as the server system 108) and are capable of producing desired library files 340.

In one embodiment, the language conversion library files 348 may be used by the processing module 350 (e.g., the processor 220 of the system 108) for converting audio input, text input and video input into a plurality of different languages as per user preferences. For example, one language can be converted to another language straight forward with grammar and vocabulary. Alternatively, one language can be converted to another language through a bridge language/intermediate language. The bridge language/intermediate language can be any existing language or all together a new language. The existing language may include all kinds of languages including musical and symbolic languages that can be used for communication between humans. Criteria for selection of intermediate language may include, for example, a superset of vocabulary and grammar of a plurality of different languages. For example, Chinese can be converted to an intermediate language English, which can be converted into other target languages such as Spanish or French. It is noted that there can be multiple intermediate languages between source and target languages and they can be user configurable as well.

In an embodiment, the library files 340 may be sophisticated as per daily usage of the device 300 by updating new input content on a periodic basis for later use. In addition to characterization, the library files 340 can be edited. The library files 340 can be put in a learning mode algorithm, which can learn and enhance the library files 340 by learning from stored data or live data being received from various content sources (such as the content sources 332, 334 and 336). Further, the library files 340 may be improved/enhanced through algorithms that use best benchmarked data to improve/enhance the library files 340. It is noted that the library files 340 may or may not co-exist in the device 300 and may be received from various sources such as the remotely located lab 360 using a communication module 354 depending upon factors such as need, accuracy, sophistication and the like. In one embodiment, the library files 340 can go through algorithms of self-learning based on iterative minimization of error of actual output with respect to desired output through a feedback mechanism. The feedback mechanism may be machine based and/or human based (i.e. receiving feedback from users of the device 300).

The device 300 further includes a plurality of other modules such as an audio enhancer 312, a text enhancer 314, a video enhancer 316, an output combiner 352, the communication module 354, a content separator 358, a user configuration module 362 and the like. In one embodiment, the audio enhancer 312, the text enhancer 314 and the video enhancer 316 may functionally correspond to the content enhancer module 260 of the system 108 of FIG. 2. In an example, the audio enhancer 312 is configured to receive the audio input from the input module 320 which receives the audio input from the audio source 302. The audio enhancer 312 is configured to provide signal conditioning and processing of the audio input in analog and digital formats and domains using hardware and/or software. In an example, the audio enhancer 312 also receives input from the audio library files 342, which contains the audio characteristics, to improve quality of the received audio input.

The text enhancer 314 is configured to receive text input from the input module 320 which receives the text input from the text source 304. The text enhancer 314 also includes required hardware and/or software such as a reader for soft copy files and a scanner to read hardcopy files. Using the text library files 344, the text enhancer 314 improves the quality and understanding of the text input received from the text source 304. The text enhancer 314 is configured to perform signal conditioning and processing of the text input in analog and digital formats and domains using hardware and/or software.

The video enhancer 316 is configured to receive video input from the input module 320 which receives the video input from the video source 306. The video enhancer 316 is configured to provide signal conditioning and processing of the video input. The video enhancer 316 also receives input from the video library files 346 which contains the video characteristics to improve quality of the video input. The video enhancer 316 is configured to provide signal conditioning and processing of the video input in analog and digital formats and domains using hardware and/or software.

In one embodiment, the user may provide the user preferences using an input interface of the input module 320. The user preferences may be sent to the user configuration module 362 which is further configured to forward them to the processing module 350. Depending upon user preferences received from the user configuration module 362, the processing module 350 is configured to perform one or more actions. The processing module 350 receives input content from the audio enhancer 312, the text enhancer 314 and the video enhancer 316. The processing module 350 is further configured to receive inputs in terms of one or more relevant content characteristics from the audio library files 342, the text library files 344, the video library files 346 and the language conversion library files 348 generated by the lab 360. The processing module 350 is configured to generate the output content from the input content utilizing the content characteristics accessed from the library files 340.

In one embodiment, the processing module 350 is configured to execute one or more algorithms such as, but not limited to, text to speech algorithm, speech to text algorithm, language conversion algorithm, facial recognition algorithm, voice recognition algorithm and the like. Further, the processing module 350 is configured to receive either audio input, text input, video input or a combination thereof, and it has capability to produce an audio output 322, a text output 324 and a video output 326. Further, the output content (e.g., the audio output 322, the text output 324 and the video output 326) can be generated in any language using the language conversion library files 348. The transmitter 330 is configured to transmit the generated output content either over legally allowed radio frequencies or as a stream over internet/intranet. An example of the transmitter 330 can be a wired or wireless intranet and/or internet. Another example of the transmitter 330 can be radio frequency modulator and amplifier that can transmit content over legally allowed radio frequencies. The transmitter 330 can also take example of any other device that can be used to send content by any suitable communication medium so that the content can be received by a receiver. In practical examples, the transmitter 330 can also transmit different converted content as different streams on internet/intranet and receiver can receive these streams selectively through internet/intranet. For instance, the transmitter 330 can transmit contents C1, C2, C3 (of same content or different content) over streams S1, S2 and S3, and the receiver can selectively receive an intended content from among the contents C1, C2, C3.

It is understood that all the interfaces of the device 300 can be built into the device 300 or can be attached to the device 300 via wired or wireless connections. This allows the device 300 and the interfaces to be remotely located. For example, camera, microphone, display screen, speaker etc. and the device 300 can be used in a client server mode as explained with reference to the system 108 of FIG. 1.

In an embodiment, the output combiner 352 is configured to combine the audio output 322, text output 324 and the video output 326 generated by the processing module 350. The output combiner 352 is further configured to convert the output content in a proprietary format. This proprietary format may have associated abilities/utilities to convert back and forth from the commercially available formats e.g., Microsoft word and the like. The combined output format may use a storage efficient compression algorithm (for example, a zip file) while storing the content in the memory of the device 300 before sending it to the transmitter 330 or to a remote device such as a remote device 356. The remote device 356 may be any electronic device with communication capabilities including the user device associated with the user.

The communication module 354 may include mechanisms configured to receive inputs from and provide outputs to the remote device 356. The communication module 354 may include a transmitter for wirelessly communicating information to the remote device 356, and a receiver for receiving information from the remote device 356. In one embodiment, the remote device 356 may be a content access device (e.g., the content access devices 204*a*, 204*b* and 204*c* of FIG. 2 or the content access devices 112*a*, 112*b*, 112*c* and 112*d* of FIG. 1). In other embodiments, the remote device 356 may be an example of a system such as the system 108 of FIG. 1 which is capable of processing the input content to generate the output content and facilitate the output content on the transmitter 330 of the device 300.

In one embodiment, the input module 320 of the device 300 is configured to receive multimedia input from the multimedia source 308 in order to generate the multimedia output or separate output files based on user preferences received from the user configuration module 362. In one embodiment, the multimedia input may be received from the remote device 356. In other embodiments, the multimedia input may be the output content generated by the output combiner 352 and received by the remote device 356 via the communication module 354.

In one embodiment, the content separator 358 may separate the content (the audio, video and text input) received from the input module 320 which is further received from the audio source 302, text source 304 and video source 306 based on delimiters provided between units of content. For example, in case of document conversion (text input), punctuation marks can serve as delimiters for the content separator 358 so that content in one document will be separated based on the punctuation marks such as a full stop, comma, or question mark and will be converted and presented accordingly in the requested format. Similarly, in case of audio content, pause/silence between two audio messages or dialogues of different persons can serve as delimiters/separators. Similarly, in case of video content, video frames can be used as delimiter for separating the video content. The delimiters can be configured, and new delimiters can also be added for improving content separation. In another embodiment, the content separator 358 is capable of separating the multimedia input received from the input module 320 which is received from the multimedia source 308 and then facilitate it on the transmitter 330. In one embodiment, the audio, video and text input may be separated from each other (i.e., the multimedia input) using delimiters between each of them. Each of audio/video/text inputs and the library files 340 may use its own storage algorithm which may further be mentioned in respective information header of each input/file. For example, each of them may have two separate storage locations identified by specific names such as information section and data section. The information section may provide information about the data section.

In one example embodiment, the device 300 is configured to process audio input received from one or more audio sources (e.g., the audio source 302 being an in-built microphone of the device 300). The audio input can be synthesized using the device 300 or substituted by the device 300. The device 300 is capable of facilitating translation and conversion of languages using the audio characteristics accessed from the audio library files 342. For example, the processing module 350 may utilize speech to text algorithm, the language conversion library files 348, and text to speech algorithm in sequence to produce original speech/song in multiple languages as per user preferences. Further, the audio library files 342 may also be configured to generate a new song or speech using stored audio characteristics. It is noted that the audio characteristics may be recorded as time domain (such as amplitude, speed, direction of sound etc.) and frequency domain (such as fundamental frequency and harmonic frequency contents of audio input or amplitude of these fundamental and harmonic frequencies) characteristics in various embodiments.

In another example embodiment, the audio characteristics may also be used for sound quality enhancement in communication systems that distort original transmitted sound due to noise in transmission media. At the receiving end of transmission line of communication system, by identifying sound with respect to stored sound, quality of distorted received sound can be enhanced/improved or selectively substituted for better audio quality by the processing module 350. This feature may further be applied to audio files stored on various media devices that get corrupted or distorted due to various reasons such as aging, degradation of material used for storing, and the like to provide quality enhancement. Additionally, enhancement in audio quality may involve audio to text conversion and then from the converted text back to audio conversion.

In one example embodiment, the input module 320 may be configured to include a writing pad (screen) with a stylus (e.g., the text source 304) for enabling the user to write/draw using stylus to provide text input to the device 300 in a handwritten/drawn format. The text library files 344 may be configured to determine text characteristics that may be used by the processing module 350 to enhance/convert the text input being written/drawn to a text output or other form of the output as per user preferences. For example, pressure with which user writes with stylus/pen on the writing pad, speed of writing/drawing, color selection to write/draw, other activities performed using the pad and the like may be used by the processing module 350 to analyze and determine various features of the text input.

For example, for a written document, using the characteristics such as pressure, speed of writing, content of writing and style of writing, the processing module 350 may be configured to analyze human nature and may further be able to associate with voice of the user. In an example scenario, if the written document is to be converted to an audio form in a specified language in the voice of the user who is writing the document, and if the audio library files 342 already include the user's voice, the processing module 350 may fetch the relevant file and produce the desired output. In various embodiments, a keyboard input using mechanical keys or touch screen, various types of page scanners or character scanners, images of the document captured by the camera, etc., may also be detected by the device 300 to determine various characteristics of the document. The output content generated using the document with all the information can be stored inside the device 300 or can be sent to the remote device 356 connected to the device 300 via wired or wireless connections (such as a printer to produce a printed copy of the text output).

In one example embodiment, the video source 306 may be capable of providing any form of video input stored or captured in real time. Some non-exhaustive examples of the video source 306 include cameras such as Digital Single-Lens Reflex (DSLR), camcorder, movie cameras and the like. In one embodiment, audio associated with video input may be handled by the audio enhancer 312 and processed by the processing module 350 using the audio characteristics as explained hereinabove. The video library files 346 are configured to provide the video characteristics such as identifying various parts of the human body by monitoring leg movement, facial expression, hand movement, steps size, sitting posture, angle, speed of walking and the like. For a real time, scenario, a user can himself/herself characterize different physical expressions and the same can be processed by the processing module 350 to generate the desired output content. In one embodiment, the camera associated with the device 300 may be configured to listen to audio, record video, capture images or other interactions that are within field of view to identify people, objects and other relevant content. This may be sent to the video library files 346 to further characterize various non-living aspects of the video input such as river, mountains and the like. This characterized data can be used by the processing module 350 to generate a different video output (movie scene) using only a portion of the original content.

The content converter device 300 is a configurable device, and it can work in client server mode, stand-alone mode, or even in a mode in which work can be split between the client and the server. The library files and instructions for the content conversion can be shared between the server and the client, and can be updated in a dynamic manner. For instance, new algorithms of content conversion, whenever available, can be learnt by the client from the server. Alternatively or additionally, desired algorithms can be obtained from the server and stored in the client which acts as the content converter device. The content converter device 300 can be trained to style of users to produce/generate more accurate output for users. A natural protocol of interaction will emerge in the event of content exchange among users using the content converter device 300.

Figure 4A:
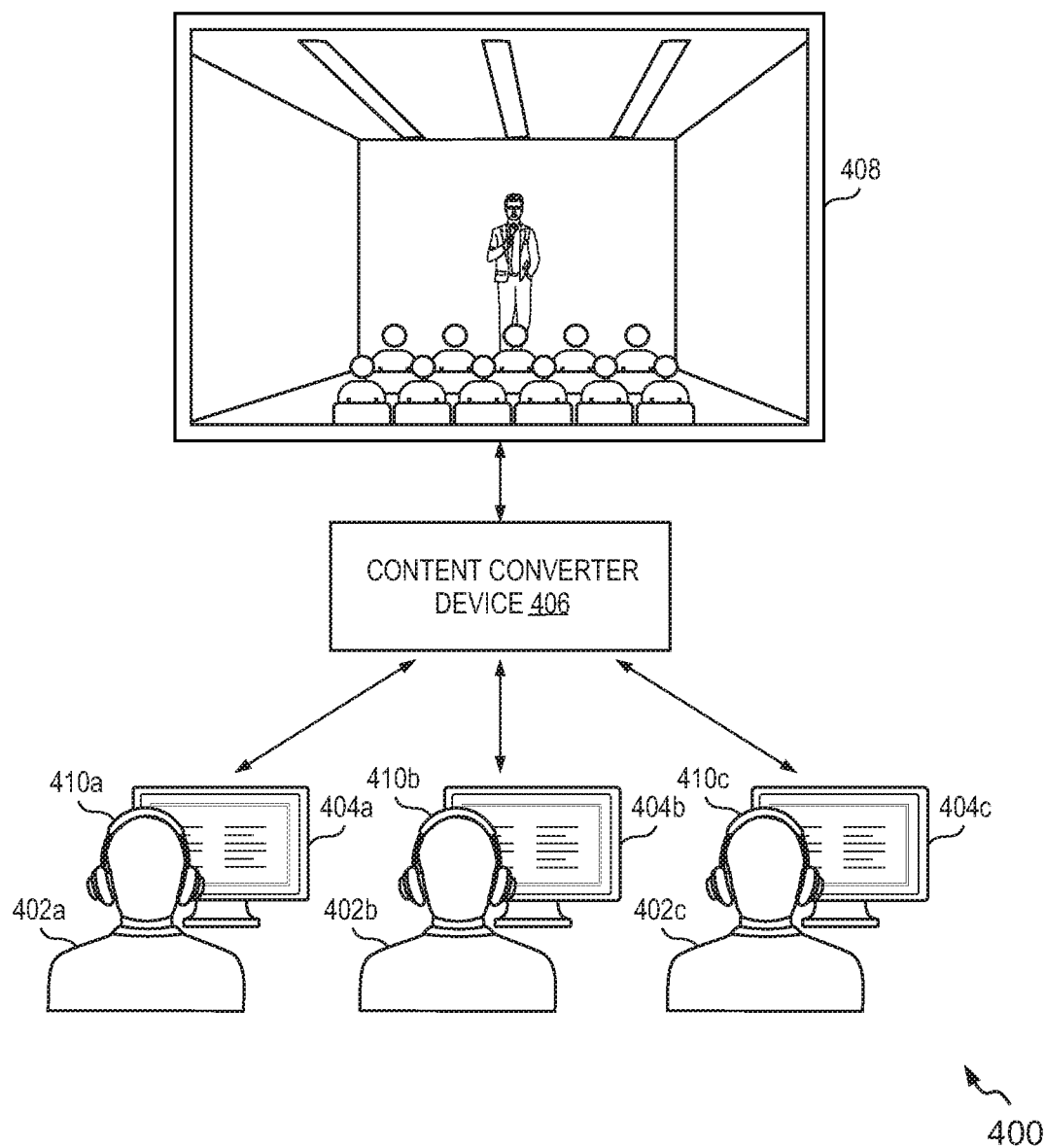
FIG. 4A illustrates a simplified representation for facilitating content conversion in an example scenario, in accordance with an example embodiment.

FIG. 4A shows a simplified representation 400 for facilitating content conversion in the public center 200 in one example scenario, in accordance with an example embodiment of the present disclosure. The representation 400 includes an example scenario, where an educational video is being displayed to users 402a, 402b and 402c on a screen 408 present in the public center 200. The educational video is recorded in a French language and the users 402a, 402b and 402c does not understand the language used in the educational video. A content converter device 406 (e.g., the content converter device 300 of FIG. 3) is shown being used in the public center 200. The users 402a, 402b and 402c want to gain the learning provided by the educational video but are not able to interpret anything from the video as their native languages are Chinese, English and German respectively.

In an embodiment, the users 402a, 402b and 402c provide their language preferences to a system (e.g., the system 108 employing at least one content converter device 406) using user devices (nor shown) provided in the public center 200 for receiving user preferences. The educational video displayed on the screen 408 acts as a content source for the content converter device 406. The content converter device 406, upon receiving the user requests, tries to convert and translate the video being (i.e. the content source) displayed in to the requested languages by separating the video based on delimiter, such as video frames. A processing module (e.g., the processing module 350) of the content converter device 406 may utilize video frames, and video and language conversion characteristics stored in respective library files (as generated by the lab 360) to obtain the desired audio and video output contents. The video output contents may be displayed on the content access devices 404a, 404b and 404c associated with the users 402a, 402b and 402c respectively, and audio output contents may be provisioned on the headphones 410a, 410b and 410c connected to the content access devices 404a, 404b and 404c respectively. The users 402a, 402b and 402c enjoy the requested output contents (video output contents and audio output contents in their own native language) displayed on their content access devices 404a, 404b and 404c as now they can gain the learning provided by the video.

Figure 4B:
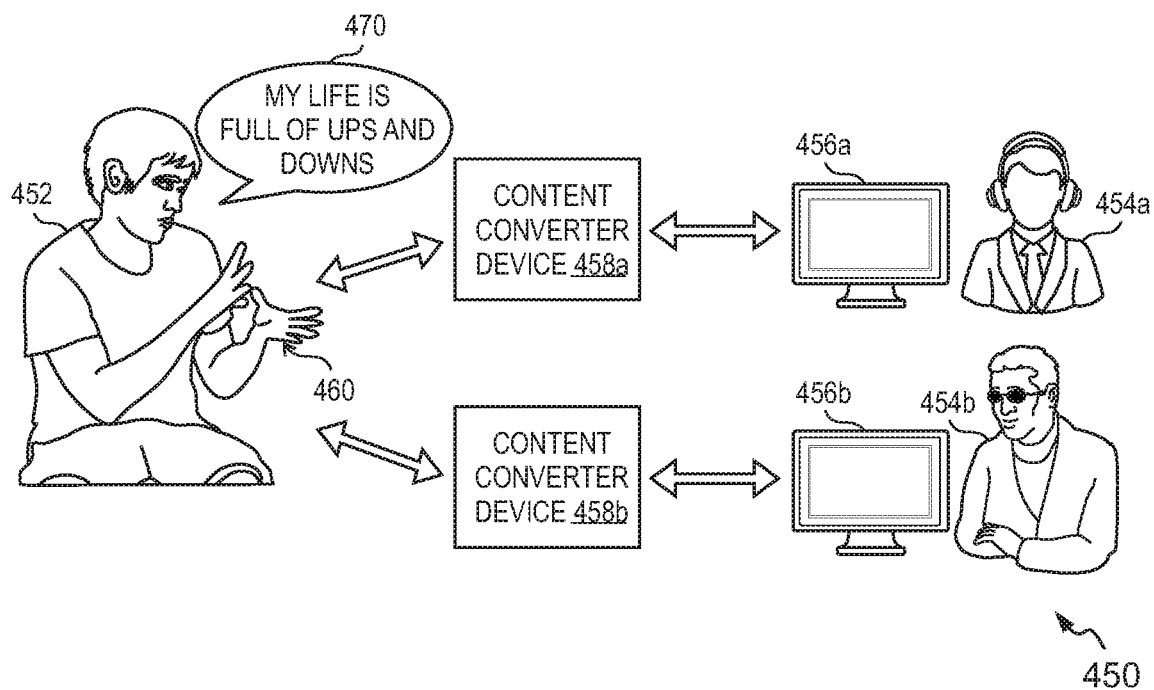
FIG. 4B illustrates a simplified representation for facilitating content conversion in another example scenario, in accordance with an example embodiment.

FIG. 4B shows a simplified representation 450 for facilitating content conversion in the public center 200 in another example scenario, in accordance with an example embodiment of the present disclosure. The representation 450 includes an example scenario, where a user 452 is a hearing-impaired person and is using signs 460 (e.g., hand movements) to share his life learnings with another users 454a and 454b present in the public center 200. The user 454a is a normal human being so he can see, speak and hear completely but he does not understand interpretation of sign language. The user 454b is visually-impaired person so he cannot see what is happening around him. The user 452 is shown to convey a message 470 (exemplarily depicted as 'My life is full of ups and downs) using the signs 460. Content converter devices 458a and 458b (e.g., the content converter device 300 of FIG. 3) are shown being used in the public center 200 where the users 452, 454a and 454b are assembled to gain all time knowledge of human beings in particular to know how to live a healthy, happy and joyful life by knowing about life experiences and learning of different peoples.

In an embodiment, the users 454a and 454b provide their language preferences to a system (e.g., the system 108 employing at least one content converter device) using user devices (nor shown) provided in the public center 200 for receiving user preferences. The signs 460 used by the user 452 acts as a content source for content converter devices 458a and 458b. In one embodiment, the content converter devices 458a and 458b can be trained to include and interpret the sign languages and gestures. Further, the content converter devices 458a and 458b may have the capability to see the user 452 using in-built cameras (or connected to the devices 458a and 458b by wired or wireless connection) to capture video of the user 452 performing the sign language 460. This video input may be improved by a video enhancer (such as the video enhancer 316 of FIG. 3) of the content converter devices 458a and 458b and there-after may be sent to processing modules of the content converter devices 458a and 458b for converting it into preferred languages provided by the users 454a and 454b to understand the message 470 being conveyed by the user 452.

In an embodiment, the processing module of the content converter device 458a may utilize video characteristics and language conversion characteristics stored in respective library files (as generated by the lab 360) to interpret and convert the signs 460 into audio output. The audio output may be provisioned on headphones connected to a content access device 456a being used by the user 454a.

In an embodiment, the processing module of the content converter device 458b may utilize video characteristics and language conversion characteristics stored in respective library files (as generated by the lab 360) to interpret and convert the signs 460 into text output. The text output is displayed on a display screen of a content access device 456b being used by the user 454b. Additionally, the display screen may raise the characters of the text for touch and feel of the characters for the visually impaired user 454b so that the user 454b easily understands the message 470 conveyed by the user 452.

Figure 5:
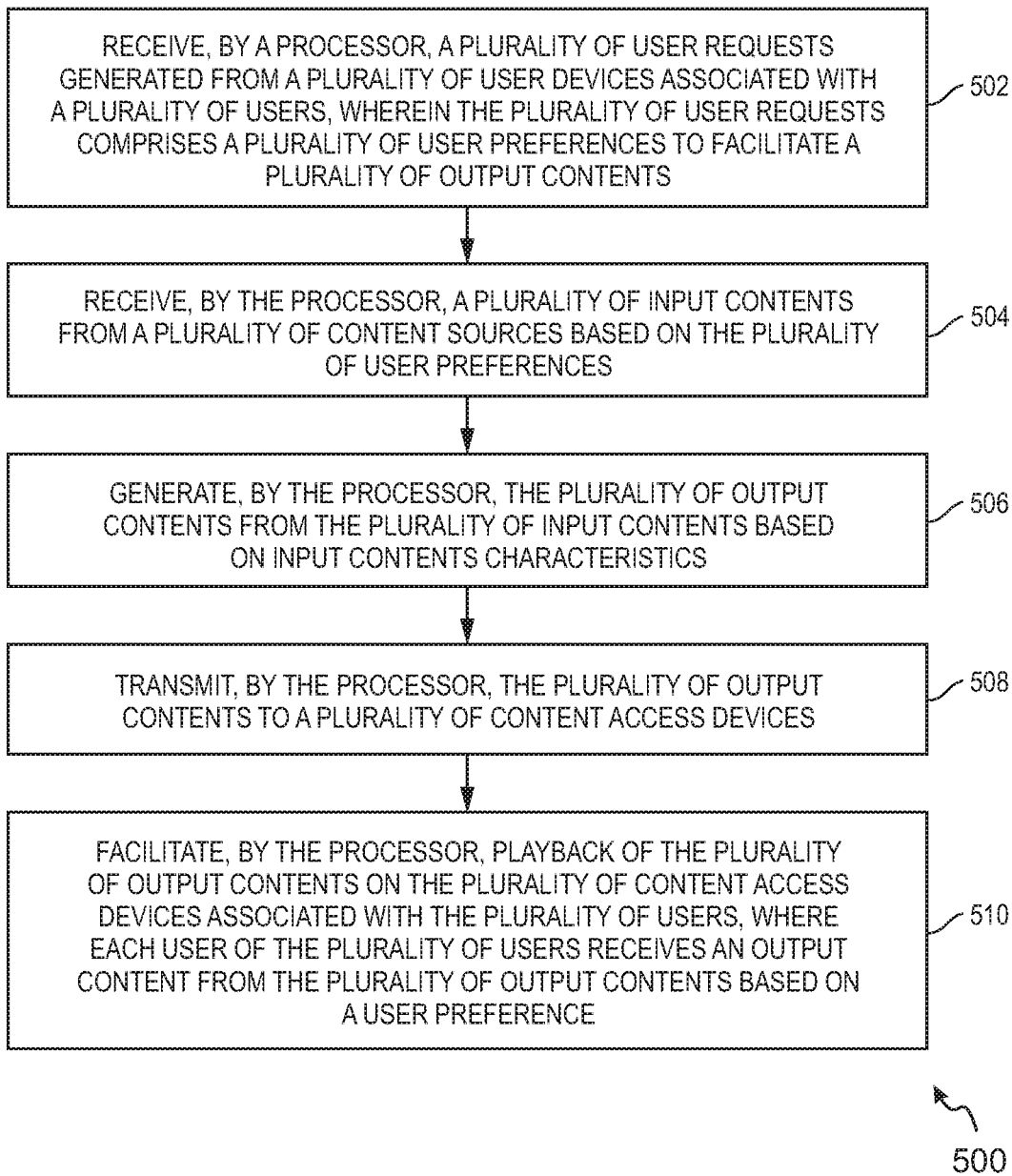
FIG. 5 illustrates a flow diagram of a method for facilitating content conversion in the public center, in accordance with an example embodiment.

FIG. 5 is a flow diagram of a method 500 for facilitating content conversion, in accordance with an example embodiment of the present disclosure. The various steps and/or operations of the flow diagram, and combinations of steps/operations in the flow diagram, may be implemented by, for example, hardware, firmware, a processor, circuitry and/or by the system 108 of FIG. 1, and/or by the content converter device 300 of FIG. 3 and/or by a different electronic device associated with the execution of software that includes one or more computer program instructions.

At 502, a plurality of user requests generated from a plurality of user devices associated with a plurality of users are received by the system 108 of FIG. 1. The plurality of user requests includes a plurality of user preferences to facilitate a plurality of output contents. For example, the user may visit the public center with a wish to listen a video of his/her favourite teacher in his/her preferred language so the user preference that he will provide to the system used in the public center will be his/her preferred language. In one embodiment, the user preferences may further include level of accuracy desired in the output content, format of output content, enabling bridge language conversion while document conversion from one language to another language, preferences related to bridge languages to be used, the content access device on which the output content is desired to be received, and the like.

At 504, a plurality of input contents is received from a plurality of content sources based on the plurality of user preferences. The system or the content converter device is configured to receive audio input, text input, video input or multimedia input from the respective content sources. In one embodiment, the input content may be conditioned in terms of quality improvement by at least one content enhancer module such as the audio enhancer 312, the text enhancer 314 and the video enhancer 316 of FIG. 3 before generating the output content as per the user preferences.

At 506, the plurality of output contents is generated from the plurality of input contents based on input content characteristics. The input content characteristics are accessed from a plurality of content based library files for conversion of the plurality of input contents into the plurality of output contents. In one embodiment, the content characteristics are stored as digitized data organized as object of a class into each library file. The library files are generated by a laboratory equipment (such as the lab 114/lab 270/lab 360).

At 508, the plurality of output contents is transmitted to a plurality of content access devices associated with the plurality of users. The plurality of output contents is transmitted over same or different legally allowed radio frequencies.

At 510, playback of the plurality of output content is facilitated on the plurality of content access devices associated with the plurality of users by the processor. Each user of the plurality of users receives an output content from the plurality of output contents based on the his/her preferences. The user may tune to the frequency at which the output content is transmitted to obtain the output content on his/her content access device.

Figure 6:
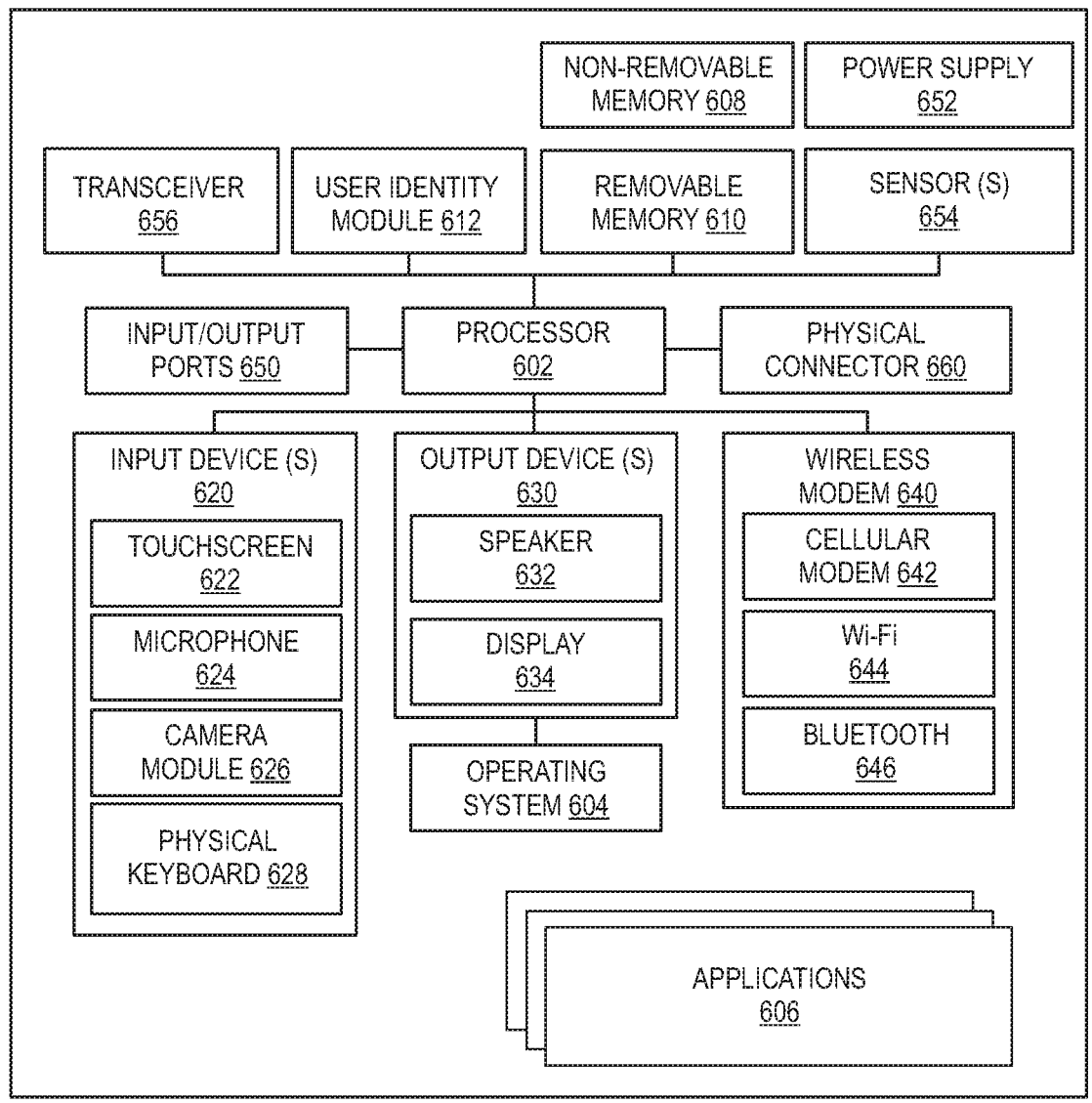
FIG. 6 shows simplified block diagram of a user device, for example, a mobile phone capable of implementing at least some embodiments of the present disclosure.

FIG. 6 shows simplified block diagram of a user device 600 or a content accessing device seen in FIG. 1, in accordance with one embodiment of the present disclosure. The user device 600, for example, can be a desktop computer or a mobile phone capable of implementing the various embodiments of the present disclosure. The user device 600 is depicted to include applications 606.

It should be understood that the user device 600 as illustrated and hereinafter described is merely illustrative of one type of device and should not be taken to limit the scope of the embodiments. As such, it should be appreciated that at least some of the components described below in connection with that the user device 600 may be optional and thus in an example embodiment may include more, less or different components than those described in connection with the example embodiment of the FIG. 6. As such, among other examples, the user device 600 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 600 includes a controller or a processor 602 (e.g., a signal processor, microprocessor, ASIC, or other control and processing logic circuitry) for performing such tasks as signal coding, data processing, image processing, input/output processing, power control, and/or other functions. An operating system 604 controls the allocation and usage of the components of the user device 600 and support for one or more applications programs (see, the applications 606), that implements one or more of the innovative features described herein. The applications 606 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 600 includes one or more memory components, for example, a non-removable memory 608 and/or removable memory 610. The non-removable memory 608 and/or the removable memory 610 may be collectively known as database in an embodiment. The non-removable memory 608 can include RAM, ROM, flash memory, a hard disk, or other well-known memory storage technologies. The removable memory 610 can include flash memory, smart cards, or a Subscriber Identity Module (SIM). The one or more memory components can be used for storing data and/or code for running the operating system 604 and the applications 606. The user device 600 may further include a user identity module (UIM) 612. The UIM 612 may be a memory device having a processor built in. The UIM 612 may include, for example, a subscriber identity module (SIM), a universal integrated circuit card (UICC), a universal subscriber identity module (USIM), a removable user identity module (R-UIM), or any other smart card. The UIM 612 typically stores information elements related to a mobile subscriber. The UIM 612 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 600 can support one or more input devices 620 and one or more output devices 630. Examples of the input devices 620 may include, but are not limited to, a touch screen/a display screen 622 (e.g., capable of capturing finger tap inputs, finger gesture inputs, multi-finger tap inputs, multi-finger gesture inputs, or keystroke inputs from a virtual keyboard or keypad), a microphone 624 (e.g., capable of capturing voice input), a camera module 626 (e.g., capable of capturing still picture images and/or video images) and a physical keyboard 628. Examples of the output devices 630 may include, but are not limited to a speaker 632 and a display 634. Other possible output devices can include piezoelectric or other haptic output devices. Some devices can serve more than one input/output function. For example, the touch screen 622 and the display 634 can be combined into a single input/output device.

A wireless modem 640 can be coupled to one or more antennas (not shown in the FIG. 6) and can support two-way communications between the processor 602 and external devices, as is well understood in the art. The wireless modem 640 is shown generically and can include, for example, a cellular modem 642 for communicating at long range with the mobile communication network, a Wi-Fi compatible modem 644 for communicating at short range with an external Bluetooth-equipped device or a local wireless data network or router, and/or a Bluetooth-compatible modem 646. The wireless modem 640 is typically configured for communication with one or more cellular networks, such as a GSM network for data and voice communications within a single cellular network, between cellular networks, or between the user device 600 and a public switched telephone network (PSTN).

The user device 600 can further include one or more input/output ports 650 for establishing connection with peripheral devices including a power supply 652, one or more sensors 654 for example, an accelerometer, a gyroscope, a compass, or an infrared proximity sensor for detecting the orientation or motion of the user device 600 and biometric sensors for scanning biometric identity of an authorized user, a transceiver 656 (for wirelessly transmitting analog or digital signals) and/or a physical connector 660, which can be a USB port, IEEE 1294 (FireWire) port, and/or RS-232 port. The illustrated components are not required or all-inclusive, as any of the components shown can be deleted and other components can be added.

The disclosed method 500 or one or more operations of the method 500 may be implemented using software including computer-executable instructions stored on one or more computer-readable media (e.g., non-transitory computer-readable media, such as one or more optical media discs, volatile memory components (e.g., DRAM or SRAM), or non volatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Various example embodiments offer, among other benefits, techniques for establishing system, device and method for facilitating content conversion in public centers and thereby enhancing user experience, increasing social interactions and learning capabilities of the users. The public center can be a world knowledge library. Such library may include accommodation centers and learning centers to gain knowledge from ancient time to modern time irrespective of the teachers and the audience being from different cultures and knowing different languages. Thereby, by providing a public center, people from different regions can meet and communicate with each other irrespective of languages known, in verbal and/or written form. The public center can be a movie theatre or an auditorium or a classroom where people knowing different languages can listen and watch the video (or lecture) in their preferred languages. Further, the public center can be a musical lab, a movie making studio, a court, a lab for psychoanalysis of human nature or any place where people want to communicate and understand other's communication irrespective of their learnt way of communication.

Moreover, the public center can be used by the persons with disabilities also. The systems used in the public center are trained with the language of reading by touch and feel and sign languages such that, a visually impaired person can read any book written in any language in his own language of touch and feel and a hearing-impaired person can listen to any other person by viewing his own sign language even if the other person does not understand the sign language.

The existing public libraries (or to be developed) may install/build/setup necessary structures/fixtures to facilitate use of the content converter devices. For example, a room can be built or setup with necessary requirements to facilitate the content conversion described in the present disclosure, and especially with reference to FIG. 4B. Further, public centers such as an existing physical public library can install content converters server (containing content converter devices) centrally for converting its library contents for the end users visiting that library. For example, a person issuing physical book can use personal scanner (line or character or page scanner) to scan book and read or hear it in any desired language on display or can print it on printer.

The content converter device (such as the device 300) described herein can be utilized (or embodied) in any existing (or to be developed) electronic device that deals with content. For instance, an electronic device processes content in one particular language, if integrated with the content converter device, can be able to offer processed content in multiple languages as desired by different users.

The content converter device, described herein with reference to the public center, can also be used with existing content devices, such as television sets, printer, scanner etc., as an external add-on device for facilitating content conversion. For example, a voice of a celebrity in a TV show can be seen in a sign language converted by the content converter device. Similarly, a scanner can print a document in any language using the add-on content converter device. Further, the new content devices can be built using content converter device to facilitate conversion of content into desired languages. For example, a television set equipped with content converter device may provide the functionality of automated audio to text caption conversion in a desired language.

In another user case of the content converter device, a person can hear him/her speaking in multiple languages in his/her own voice using the content converter device provided in the public center.

It should be noted that the content conversion can be performed by the content converter device in a real-time (on-line) manner or in an offline manner. As an example of offline content conversion, a TV show can be uploaded to content converter server containing the content converter device by the user. In this example, once the content conversion is completed, the converted content can be downloaded back by the user, and can be played back later.

The existing physical public libraries can also install the content converter server centrally for converting the library contents as per requirement of end user visiting the public library. For example, a blind person willing to read a physical book at the existing physical library can use a personal scanner (line or character or page scanner) and an audio system supported by the content converter server to scan a book and hear it in any desired language. It should be noted that the existing libraries may require to install/build/setup necessary structures/fixtures to facilitate use of the content converter server.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using analog and digital hardware circuitry (for example, complementary metal oxide semiconductor (CMOS) based analog and digital logic circuitry), firmware, software and/or any combination of hardware, firmware, and/or software (for example, embodied in a machine-readable medium). For example, the systems and methods may be embodied using transistors, logic gates, and high voltage and low voltage electrical circuits (for example, application specific integrated circuit (ASIC) circuitry and/or in Digital Signal Processor (DSP) circuitry, analog circuits for signal capture and conditioning).

Particularly, the system 108 and its various components may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations (for example, operations explained herein with reference to FIG. 5). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure. Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A public center, comprising:
   a content source configured to provide a plurality of input multimedia contents;
   at least one content converter device for generating a plurality of output multimedia contents from the plurality of input multimedia contents based on user requests from a plurality of users, wherein each content converter device comprises:
   an input module configured to receive a user request from a user of the plurality of users and an input multimedia content of the plurality of input multimedia contents based on the user request, the user request comprising one or more user preferences, and
   a processing module configured to generate an output multimedia content from the input multimedia content based on input multimedia content characteristics and the one or more user preferences, the input multimedia content characteristics being accessed from a plurality of multimedia content based library files for conversion of the input multimedia content into the output multimedia content; and a plurality of content access devices configured to provide the plurality of output multimedia contents received from the at least one content converter device to the plurality of users.

2. The public center as claimed in claim 1, wherein each content converter device further comprises:
   a transmitter configured to transmit the output multimedia content over at least one of: radio frequency; internet; and intranet; and
   a laboratory equipment for generating the plurality of multimedia content based library files based on the plurality of input multimedia contents provided by the content source.

3. The public center as claimed in claim 1, wherein each content access device of the plurality of content access devices comprises a receiver configured to selectively receive the output multimedia content from the plurality of output multimedia contents.

4. The public center as claimed in claim 1, wherein a content access device of the plurality of content access devices provides the output multimedia content to the user based on the one or more user preferences.

5. The public center as claimed in claim 1, wherein the input multimedia content of the plurality of input multimedia contents is at least one of: an audio output, a text output, and a video output.

6. The public center as claimed in claim 1, wherein the output multimedia content of the plurality of output multimedia contents is at least one of: an audio output, a text output, and a video output, and wherein the plurality of multimedia contents are transmitted to the plurality of content access devices at a plurality of different streams over at least one of internet and intranet.

7. The public center as claimed in claim 1, wherein each of the plurality of multimedia content based library files corresponds to at least one of: audio library files, text library files, video library files and language conversion library files.

8. The public center as claimed in claim 1, wherein the public center is at least one of: a public library, a movie theatre, a live performance auditorium, and a lecture hall.

9. The public center as claimed in claim 1, wherein the public center is a content theme park.

10. A public center, comprising:
    a plurality of content sources, each content source configured to provide a plurality of input multimedia contents; and
    a plurality of content converter devices for generating a plurality of output multimedia contents from the plurality of input multimedia contents based on receipt of user requests from a plurality of users, wherein each content converter device of the plurality of content converter devices comprises:
       an input module configured to receive a user request from a user of the plurality of users and an input multimedia content of the plurality of input multimedia contents based on the user request, the user request comprising one or more user preferences,
       a processing module configured to generate an output multimedia content from the input multimedia content based on input multimedia content characteristics and the one or more user preferences, the input multimedia content characteristics being accessed from a plurality of multimedia content based library files for conversion of the input multimedia content into the output multimedia content, and
       a content access device configured to provide the output multimedia content to the user.

11. The public center as claimed in claim 10, wherein each content converter device of the plurality of content converter devices further comprises:
    a transmitter in communication with the processing module and the content access module, the transmitter configured to transmit the output multimedia content to the content access module; and
    a laboratory equipment for generating the plurality of multimedia content based library files based on the plurality of input multimedia contents.

12. The public center as claimed in claim 11, wherein the content access device comprises a receiver to receive the output multimedia content from the transmitter.

13. The public center as claimed in claim 10, wherein the public center is a public library.

14. A computer-implemented method, comprising:
    receiving, by a processor, a plurality of user requests generated from a plurality of user devices associated with a plurality of users, wherein the plurality of user requests comprises a plurality of user preferences to facilitate a plurality of output multimedia contents;
    receiving, by the processor, a plurality of input multimedia contents from a plurality of content sources based on the plurality of user preferences;
    generating, by the processor, the plurality of output multimedia contents from the plurality of input multimedia contents based on input multimedia contents characteristics;
    converting, by the processor, the plurality of input multimedia contents into the plurality of output multimedia contents based on the characteristics of the plurality of output multimedia contents using a plurality of multimedia content based library files;
    transmitting, by the processor, the plurality of output multimedia contents to a plurality of content access devices; and
    facilitating, by the processor, playback of the plurality of output multimedia contents on the plurality of content access devices associated with the plurality of users, where each user of the plurality of users receives an output multimedia content from the plurality of output multimedia contents based on a user preference.

15. The method as claimed in claim 14, wherein generating the plurality of output multimedia contents further comprises:
    determining, by the processor, characteristics of the plurality of output multimedia contents requested by the plurality of users based on the plurality of user preferences.

16. The method as claimed in claim 15, wherein at least one multimedia content based library file from among the plurality of multimedia content based library files corresponds to at least one of: audio library files, text library files, video library files, and language conversion library files.

17. The method as claimed in claim 16, wherein the audio library files comprise one or more audio characteristics, the video library files comprise one or more video characteristics, the text library files comprise one or more text characteristics, and the language conversion library files comprise one or more language conversion characteristics.

18. The method as claimed in claim 14, wherein the plurality of input multimedia contents comprises: an audio input, a text input, and a video input.

19. The method as claimed in claim 14, wherein the plurality of output multimedia contents comprises: an audio output, a text output, and a video output.

20. The method as claimed in claim 14, wherein the public center is at least one of a public library and a public theme park.

\* \* \* \* \*